(12) United States Patent
Satyanarayana et al.

(10) Patent No.: US 11,592,395 B2
(45) Date of Patent: Feb. 28, 2023

(54) WIDE-AREA-SAMPLE BASED READER DESIGN FOR DIAGNOSTIC DETECTION OF BIO-PARTICLES

(71) Applicant: KAYA17 INC., Pleasanton, CA (US)

(72) Inventors: Srinagesh Satyanarayana, Pleasanton, CA (US); Sulatha Dwarakanath, Pleasanton, CA (US)

(73) Assignee: KAYA17 INC., Pleasanton, CA (US)

( * ) Notice: Subject to any disclaimer, the term of this patent is extended or adjusted under 35 U.S.C. 154(b) by 32 days.

(21) Appl. No.: 16/825,801

(22) Filed: Mar. 20, 2020

(65) Prior Publication Data
US 2020/0300766 A1    Sep. 24, 2020

(30) Foreign Application Priority Data

Mar. 22, 2019  (IN) .............................. 201941011177

(51) Int. Cl.
*G01N 21/64*        (2006.01)

(52) U.S. Cl.
CPC ................................ *G01N 21/6486* (2013.01)

(58) Field of Classification Search
None
See application file for complete search history.

(56) References Cited

U.S. PATENT DOCUMENTS

| 5,274,375 | A | * | 12/1993 | Thompson | H03M 3/424 |
| | | | | | 341/118 |
| 5,991,358 | A | * | 11/1999 | Dolazza | A61B 6/032 |
| | | | | | 378/19 |
| 2008/0149840 | A1 | | 6/2008 | Handique et al. | |
| 2012/0046203 | A1 | * | 2/2012 | Walsh | A61B 5/150503 |
| | | | | | 422/69 |
| 2013/0230844 | A1 | | 9/2013 | Egan et al. | |

FOREIGN PATENT DOCUMENTS

| CN | 102224410 B | 8/2017 |
| JP | 6088510 B2 | 1/2017 |
| KR | 20150005619 A | 1/2015 |
| WO | 2010036829 A1 | 1/2010 |
| WO | 2013014540 A2 | 1/2013 |

OTHER PUBLICATIONS

U.S. Appl. No. 16/690,589, filed Nov. 21, 2019, Satyanarayana, et al.
First Examination Report issued in connection with Indian Patent Application No. 201941011177 dated Jun. 30, 2021.

* cited by examiner

*Primary Examiner* — P. Kathryn Wright
(74) *Attorney, Agent, or Firm* — Run8 Patent Group, LLC; Leah Raddatz

(57) ABSTRACT

The present invention provides a wide-area sample-based reader design which serves as a diagnostic detection device for bio-particles.

11 Claims, 13 Drawing Sheets

PRIOR ART

WIDE-AREA-SAMPLE BASED READER DESIGN FOR DIAGNOSTIC DETECTION OF BIO-PARTICLES

CROSS-REFERENCE TO RELATED APPLICATION

This application claims the benefit of priority under 35 U.S.C. 119 from the Indian Patent Application 2019-41011177 filed Mar. 22, 2019, which is incorporated herein by reference in its entirety.

FIELD OF INVENTION

The present invention provides a wide-area-sample based reader design that serves as a diagnostic detection device for bio-particles.

BACKGROUND

The diagnostic detection devices currently available in the market are primarily based on exciting a spot of the sample and reading the emission from the same spot (FIG. 1). The spot is usually a 1 mm×1 mm area. The sample is generally contained in a vial (as in spectrophotometers using cuvettes), a transparent capillary through which the sample is flowing, or a lateral flow cartridge. In this mode of detection, the emission signal is based on the concentration of the target particle in the spot that is excited. For very low concentration of target particle, this signal can be very small and sometimes lower than the dark current or background reading level, thus rendering the sample undetectable.

U.S. patent publication 2008/0149840 provides a fluorescent detector configured to detect polynucleotides using a microfluidic channel-based cartridge. In this invention, the microfluidic channel is usually closed to avoid evaporative losses as liquid quantities are much smaller, in the range of 0.1 µl to 900 µl. Thus, US2008/0149840 uses a spot imaging method where a small 1 mm or smaller diameter spot of the microfluidic channel is imaged. This invention is restricted to detection of nucleotides in a PCR based assay.

U.S. patent publication 2013/0230844 uses a lateral flow cartridge for detection of a fluorescent signal to detect the analyte. This again is a spot detection method with a spot size of 2.5 mm×0.8 mm, thus limiting the analyte size that is detected.

Keeping in view the requirement of increasing the emission signals, the applicant has designed a reader for diagnostic detection of bio-particles which is simple, effective for a wide range of sample volumes (100 µl-10 ml), economical and can be easily used in field set up (in the absence of hospitals or laboratories).

DETAILED DESCRIPTION

Figure 1:
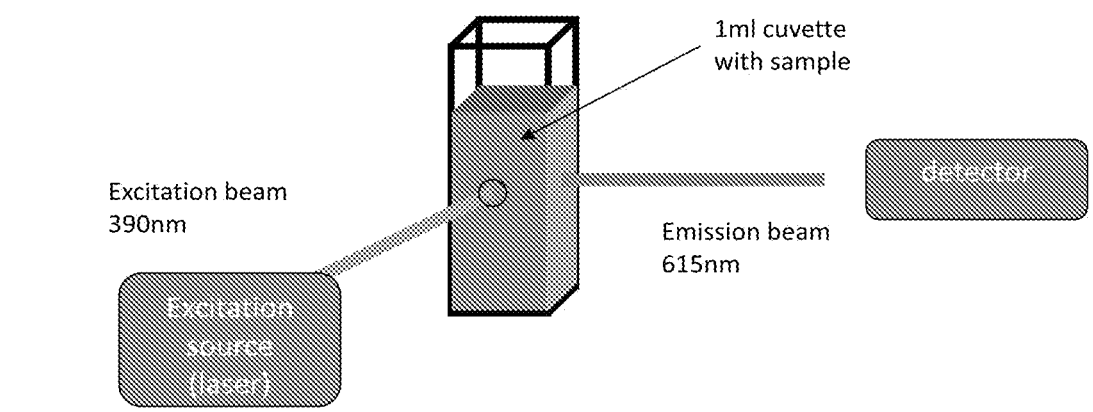
FIG. 1. Spot detection method (as known in prior art).
Figure 1:
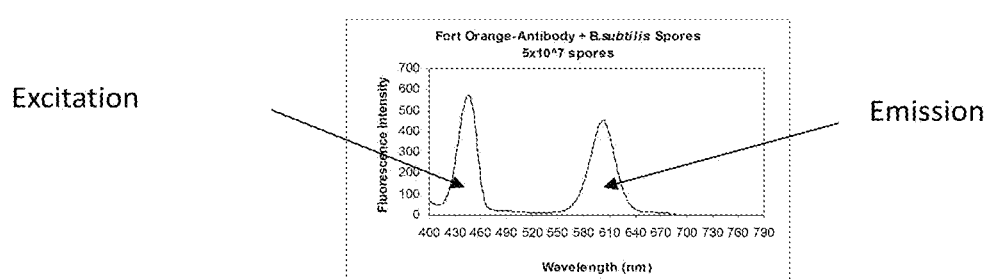
Figure 2:
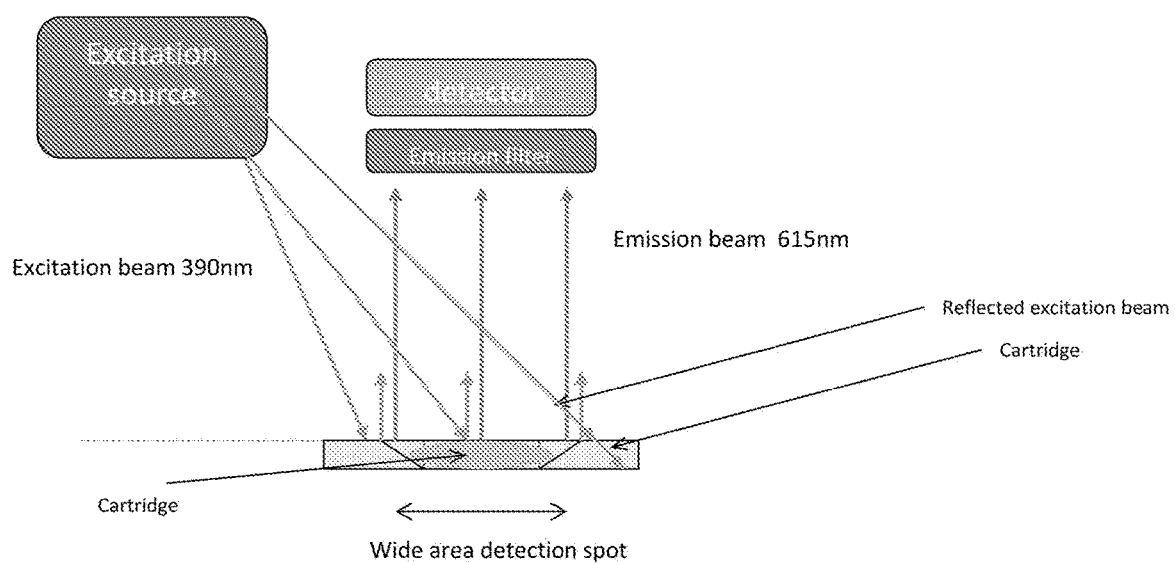
FIG. 2. Wide area detection method as described herein.

The present invention, in contrast to conventional types of detection (FIG. 1), provides a unique type of diagnostic detection reader which offers a wide area for detection as shown in FIG. 2. Here, the sample is intentionally spread over a larger area (10-100 times larger than the spot measurement method). A specialized type of cartridge (FIG. 3), for example, the one disclosed in U.S. patent application Ser. No. 16/690,589 which is incorporated herein in its entirety, is used where a 1-10 ml of sample is processed in a cavity about 10 mm×10 mm in area. The cavity is usually a 1 mm or so deep. The invention also provides for larger cavities to hold larger samples, which will require larger sized cavities. The depth of the cavity is usually kept very low so that the spreading effect is maximized and the whole sample can be uniformly illuminated by the excitation light.

The present invention provides for a cartridge and reader where the sample can be processed and read using the same cartridge. A sample size of 1-10 ml can be processed by the cartridge. However, while reading the sample, the detection cavity holds a liquid of volume 100-200 µl. This volume contains all of the tagged target bio-particles present in the starting sample (which is larger in volume) and the read buffer that is later added to the detection cavity. The buffer part of the 10 ml sample passes through the filter membrane and is absorbed by the absorbent pad.

A large area photodetector (single large area photo diode, photodiode array, photomultiplier) is used to image the large area of sample.

In one embodiment, an array photodetector is used where a large detection area can be covered. In a simple version of the detection device, the detector is the same size or slightly larger than the sample cavity area.

Figure 4:
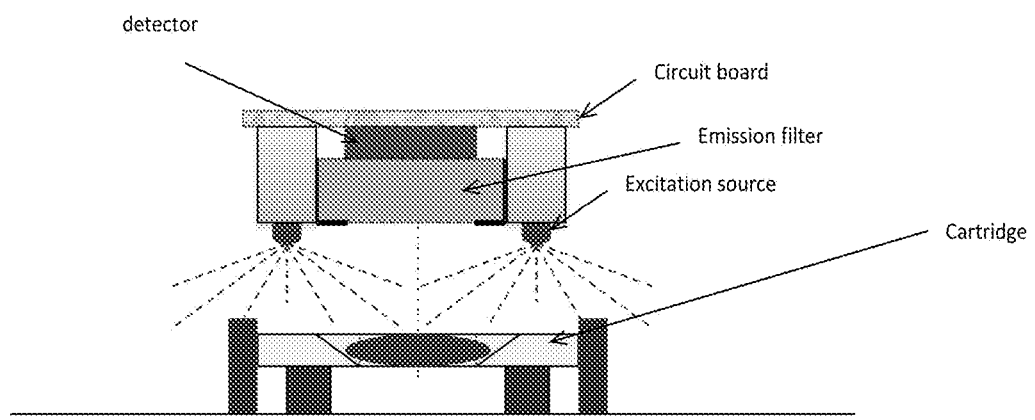
FIG. 4. Reader core (detector+excitation source) and cartridge in detection mode.

FIG. 4 shows the assembly of the cartridge, detector and excitation source.

The reader for detecting fluorescence measurement (FIGS. 7 and 8) as per the current disclosure comprises:
a) a wide-area photodetector;
b) an optical filter;
c) a slide-in slot configured to receive a vertical flow cartridge defining a cavity;
d) a low noise amplifier that amplifies the output of the photodetector;
e) an array of excitation LEDs that uniformly illuminate the cavity of the cartridge;
f) an analog integrator configure to average out the noise and increase signal content; and
g) a light-tight enclosure that houses items (a)-(f) to enable very low level fluorescence measurements.

In certain embodiments, the reader comprises an analog to digital converter that converts the analog output of the integrator into digital domain.

In certain embodiments, the reader comprises a post processor to collect a series of signal samples from the analog-to-digital converter over a time duration.

In certain embodiments, the reader comprises a temperature sensor wherein the temperature sensor is configured to collect temperature measurements of the detector simultaneous with fluorescence reading.

In certain embodiments, the reader comprises a processor including an executable algorithm stored on non-transitory medium, wherein the algorithm is configured to a) extract signal samples from a series of signal samples collected and calculate a bio-particle count from fluorescence readings, b) use the temperature measurements to compensate for temperature drift or c) both (a) and (b).

In certain embodiments, the reader comprises a multiple LED excitation and a variable or switchable optical filter such that the excitation and emission wavelengths are altered to allow use of different fluorescent probes; i.e., probes with different excitation and emission, in the reader.

When a set of signal samples are collected, there is usually a portion of time when the signal is varying and then it settles to a certain value. The algorithm looks for the settled portion of the sample stream.

The key advantages of the present invention are: there is no optics to divert all the light from the sample to the detector, this keeps the cost low; the detection is done over the whole sample rather than only a part of the sample, which is a very important advantage in the case of low concentration samples as the detection setup collects the maximum possible value of the signal from the whole sample.

Figure 5:
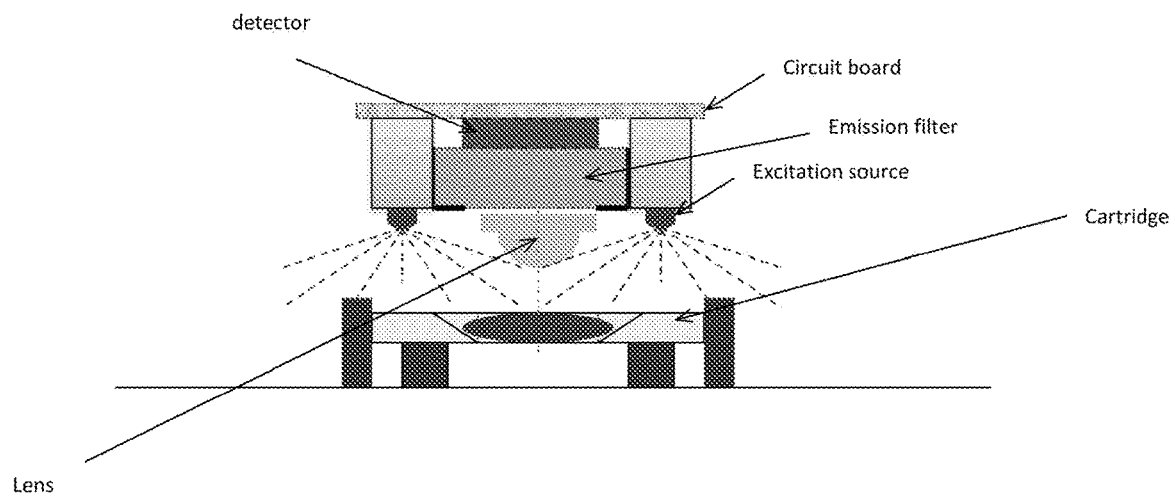
FIG. 5. Reader core (detector+excitation source) and cartridge in detection mode with lens.

In a modification of the invention, a lens (FIG. 5) is used to collect the signal from the complete sample and to feed it to the detector. This may be necessary for several reasons as provided below: detector size may not be exactly the size of the cavity; cavity size may be increased to hold larger samples (5 ml-10 ml-15 ml); and there may be a limit on the size of the array detector choice because large area photo detectors tend to have higher dark currents and higher capacitance.

A specialized cartridge is necessary for this kind of diagnostic detection. The construction of the special cartridge is described below and is disclosed in U.S. application Ser. No. 16/690,589 which is incorporated herein in its entirety.

Reader Electronics

The present invention specifically presents details of a novel diagnostic reader.

Figure 7:
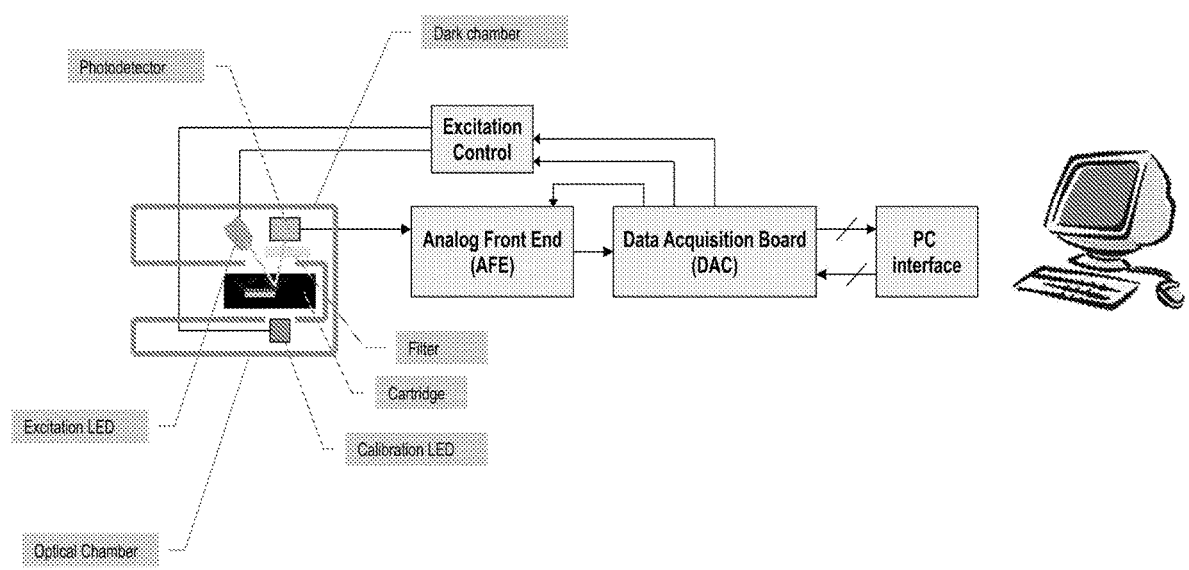
FIG. 7. Block diagram of reader and cartridge with data acquisition system.

FIG. 7 shows the construction of the reader. It contains a large- or wide-area photodetector that is placed directly over the sample cavity. An optical emission filter is mounted on the detector to ensure that other wavelengths other than the emission wavelength are significantly attenuated. An array excitation source (built out of several Excitation LEDS arranged in an array around the detector) or a single laser excitation source can be used to excite the sample. It is important to ensure that excitation intensity is uniform throughout the sample area. In the array excitation source, a calibration mechanism can be used to measure the excitation intensity over an array of points covering the sample area and the current/voltage input to the individual excitation LEDs can be adjusted to achieve a uniform/desired excitation intensity over the sample.

An optical excitation filter is used in front of the excitation source to ensure that only the excitation wavelength is transmitted to the sample, thus reducing background level of the detector.

A temperature sensor is mounted next to the detector to measure the temperature of the detector. The reading of the detector is a function of the temperature and the error due to temperature variations is minimized by using a temperature calibration algorithm to compensate for the effects of temperature.

Figure 8:
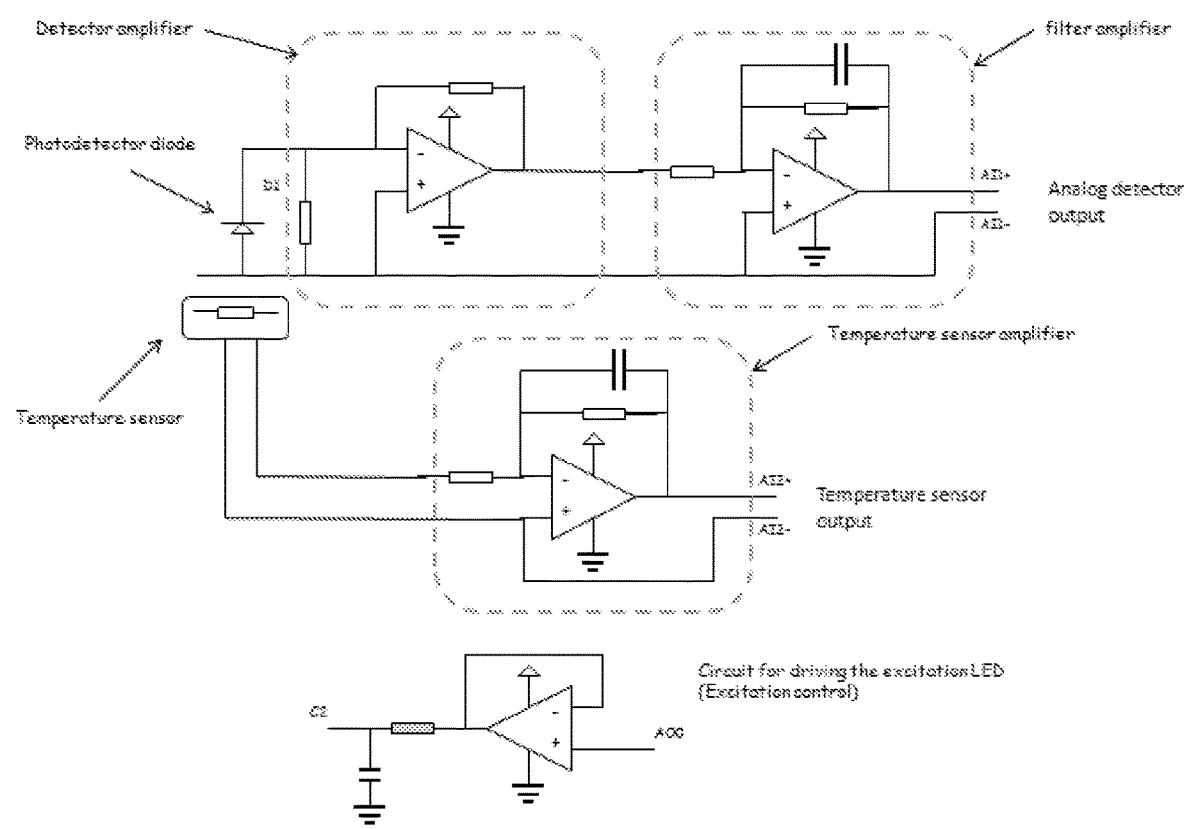
FIG. 8. Circuit topology for amplifying and filtering detector output, measuring the temperature (Analog Front End) and driving excitation source (Excitation control).

A low noise amplifier is connected to the detector input. FIG. 8 shows the circuit implementation of the low noise amplifier. A very small bandwidth and very low noise amplifier is chosen to reduce the thermal and shot noise effects.

The output of the low noise amplifier is digitized using a high-resolution A/D converter (typically 12-22 bits). The digitized readings are fed into a software algorithm that is implemented in a processor (PC or microprocessor or FPGA or custom digital chip). The software algorithm does several functions, e.g.: it first waits for the detector output to recover from saturation; and it keeps monitoring the detector output level until it has come into the typical detection range (corresponding to no external light).

Once the detector has recovered from saturation, the excitation is turned on and the detector output is monitored. Once the detector output voltage sample readings have stabilized, a series of detector output samples are collected.

The software algorithm gets a reading of the temperature from the temperature sensor. Using a temperature calibration algorithm compensates for the temperature effect.

The background reading is also established by taking a reading of the cartridge with read buffer but no probe.

The bio-particle fluorescence value is calculated by taking a reading of the cartridge with the tagged bio-particle sample (after processing of the sample with the cartridge as per the assay procedure) and a reading with read buffer only.

Using the background fluorescence value and the bio-particle fluorescence value and a calibration curve (FIG. 11), the bio-particle count is determined.

Construction of the Cartridge

Figure 3:
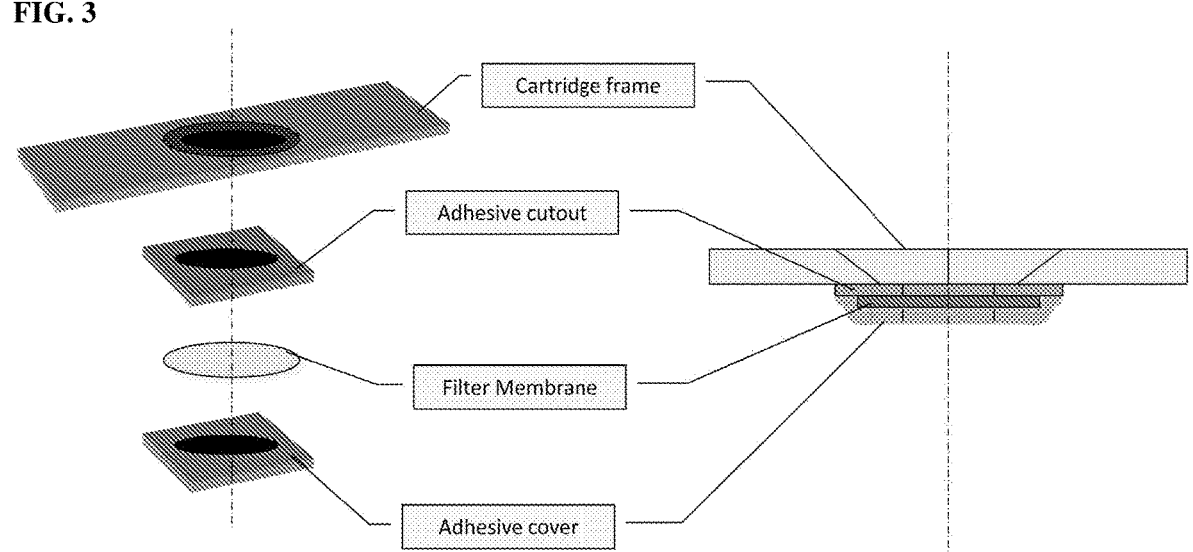
FIG. 3. Cross Section of Cartridge (substrate+membrane).
Figure 3:
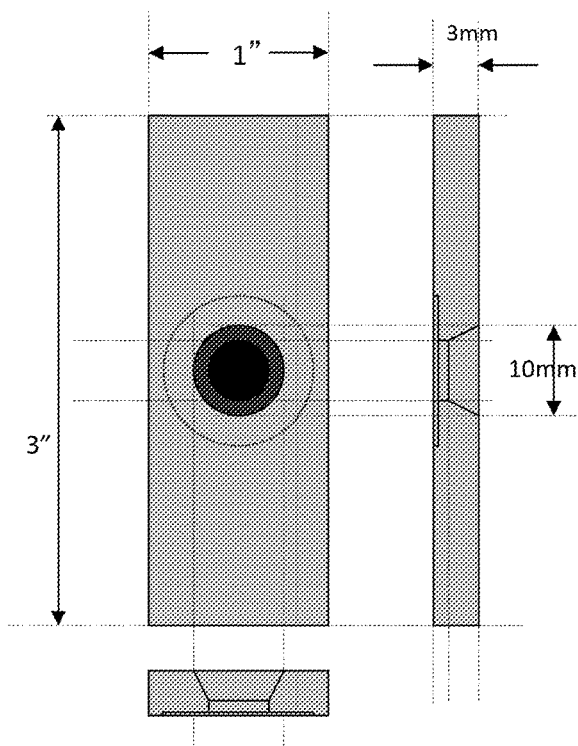

The cartridge as described here has been disclosed in U.S. patent application Ser. No. 16/690,589, which is incorporated herein in its entirety. A black non-reflective substrate of plastic (metal, ceramic, cellulose, glass can also be used if some special properties are needed), 25 mm×75 mm in size is used as the substrate. FIG. 3 shows the mechanical construction of the cartridge in its typical design form.

Several materials may be used to fabricate the cartridge and base system. The platform is made with materials such as plastic, glass, ceramics, Teflon, silicon. Some exemplary plastics are polycarbonate, polyester, polyamide, polyvinyl chloride, polymethyl-methacrylate. It is preferred that the material chosen is nonreactive to the sample, wash buffers and other reagents that they are in contact with, thereby maintaining its integrity.

The substrate is about 3 mm thick. However, the invention provides for variations if larger samples have to processed.

A conical hole is built into the substrate. The top side is wider in opening. The bottom side is smaller. Ratio of diameters is about 2:1. The top-side diameter is about 20 mm.

A filter membrane with the correct pore size is attached to the bottom side of cartridge. FIG. 3 shows the attachment of the membrane to the substrate.

The attachment is done using a double side adhesive tape. One side of the adhesive tape bonds to the black substrate plastic and the other bonds to the filter membrane. Filter membrane diameter is larger than the bottom side hole diameter (typically 15 mm). The adhesive comes with protective paper on both sides. A rectangular piece is first cut (20 mm×20 mm) and then a 15 mm hole is punched in the middle of this adhesive paper.

The pore size of the cartridge is chosen such that the target sample bio-particle after conjugation with the probe through the assay procedure will not be allowed to pass through. But the un-conjugated particles and the unused probe and other particles of no interest pass through the membrane.

The membrane itself can be any porous membrane know in the art such as nitrocellulose, mixed cellulose esters, other materials etc. and the dimensions of pores can be of the range 0.5 µm-0.05 µm, and 0.45 µm, 0.22 µm, 0.1 µm depending on whether the bio-particle is a protein, bacteria, and virus. Preferably, the said membrane is Metricell®.

Figure 6:
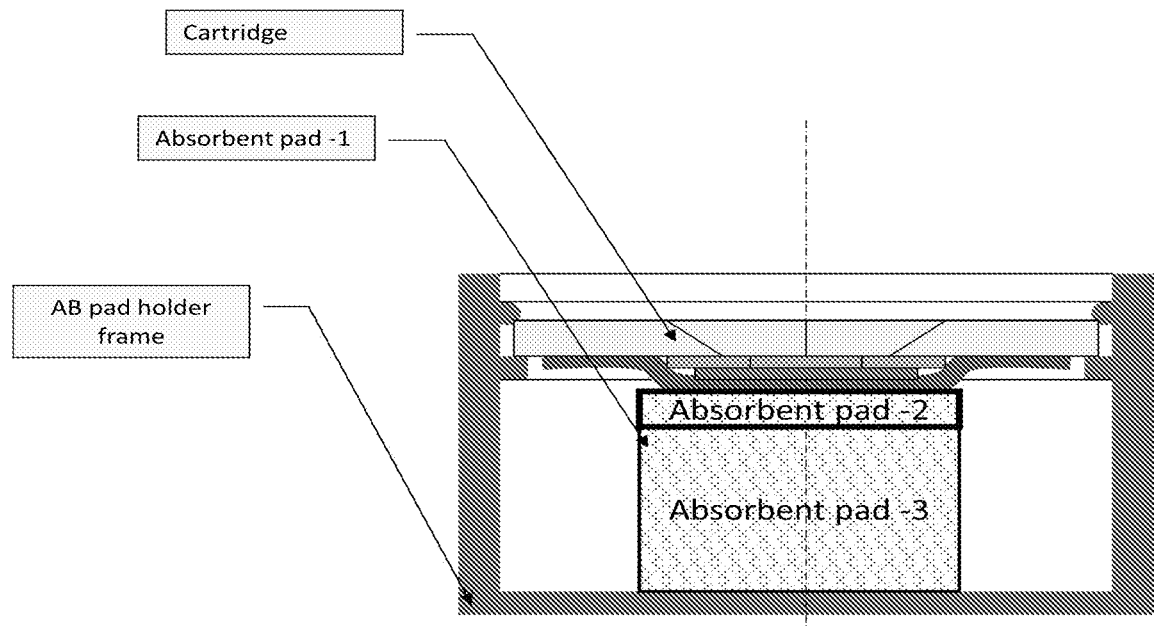
FIG. 6. Cross Section and Assembly of absorbent (AB) pad holder and Cartridge.

The cartridge is snapped into an absorbent pad holder (FIG. 6) during the assay process. The backside of the cartridge, after the filter is attached, makes contact with the absorbent pad when the cartridge is snapped into the holder.

The absorbent pad is typically 25 mm in thickness and made out of the multiple layers of individual absorbent sheets. The absorption properties of the sheets can vary to increase absorption.

Figure 12:
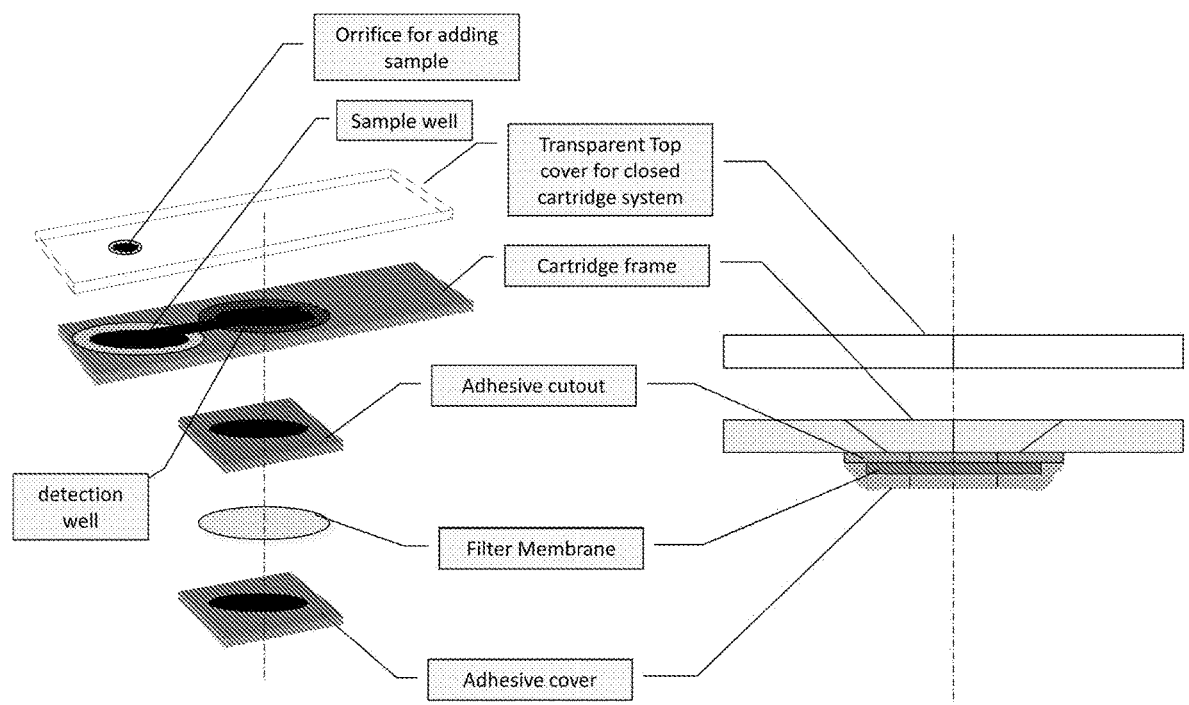
FIG. 12. Cross section of the closed cartridge with transparent top cover and sample cavity.
Figure 13:
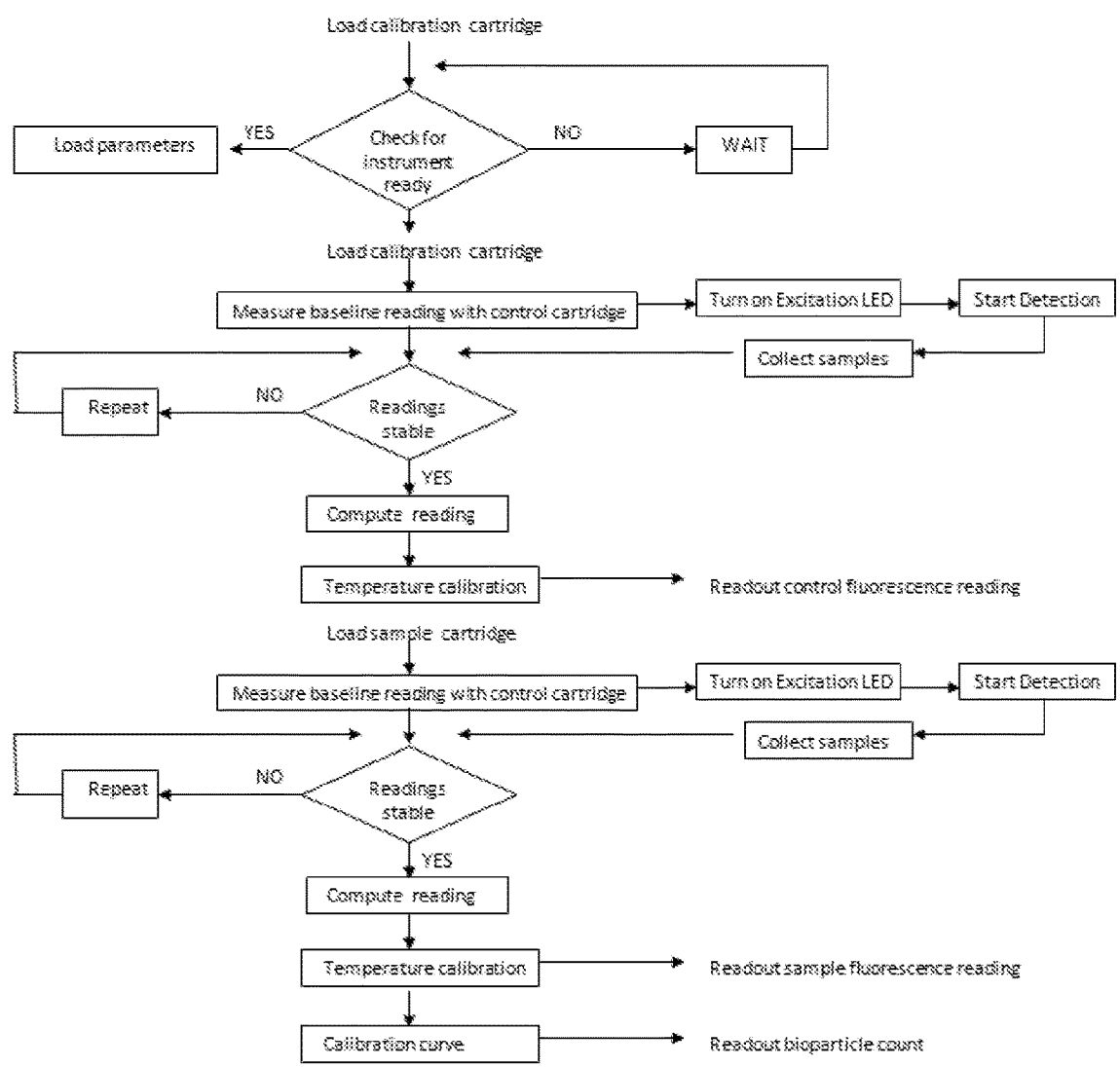
FIG. 13. Flowchart for software algorithm to control the instrument, calibrate, make fluorescence measurement and generate bio-particle count.

A closed cartridge format can also be used in this invention (FIG. 12). The closed cartridge format allows to provide a cartridge with preloaded reagents and allows us to process the sample in a closed chamber thus minimizing external contamination. Since the closed system has a transparent top cover for the sample, it works just like the open system when it comes to detection.

Furthermore, while the cartridge presented here is a single cavity cartridge, it is pointed out that a person skilled in the art will appreciate that a multi cavity cartridge or a plate reader can also be used where the detection assembly or the cartridge (plate) can be stepped to take measurements of all the samples.

Assay Procedure

The pre-processed sample (typically 5 ml in volume) is poured onto the cartridge with the absorbent pad assembly below. Pre-processing can sometimes include cleaning, sediment separation by spinning, coarse filtering, and conjugation with the probe. However, sometimes all or parts of the pre-processing can be done on the cartridge.

Once the sample is delivered, and after a few minutes, the liquid is absorbed into the absorbent pad (FIG. 6) and the target bio-particles are left on upper side of the cartridge.

Several wash steps are used to drain the unwanted excess unattached probe on the filter membrane.

Once all the liquid is drained, the cartridge is removed from absorbent pad assembly and a read buffer is added to the cartridge cavity. The read buffer quantity is typically 200 µl. This does not drain as there is no absorbent pad underneath.

The cartridge is inserted into the diagnostic reader (FIG. 7) (fluorescence spectroscopy device). The read buffer is sometimes added after the cartridge is placed in the reader. The diagnostic reader has an excitation source operating at an emission wavelength (example 395 nm) and a detector tuned to detect at the emission wavelength (example 605 nm). An optical emission filter is used to provide the selectivity at the emission wavelength. A detector is used to detect the emission from the sample. This detector signal is amplified and filtered and then used to generate the reading.

The reader lid is closed and the device is activated to take a reading. Multiple readings are taken to confirm stability.

Using a calibration curve the bio-particle fluorescence reading is used to determine the concentration of the target bio-particle on the cartridge.

Read buffer helps in wetting the membrane and decreasing the reflectivity of the membrane. It also prevents the sample from drying up when in the reader. It also helps spread the target molecules around over the cavity to get a higher reading. A reading without target particles but with only the read buffer on the cartridge is used as a baseline reference reading.

Figure 9:
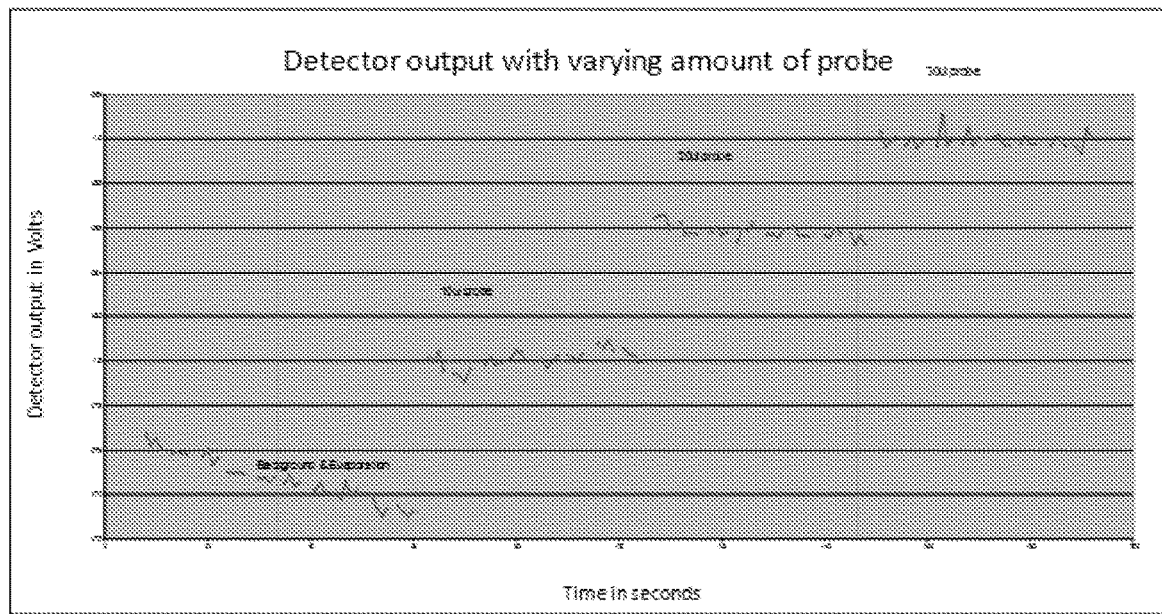
FIG. 9. Experimental data with detection done on cartridge using wide area detection and increasing amount (10 µl, 20 µl, 30 µl) of fluorescence in bio-particle.
Figure 10:
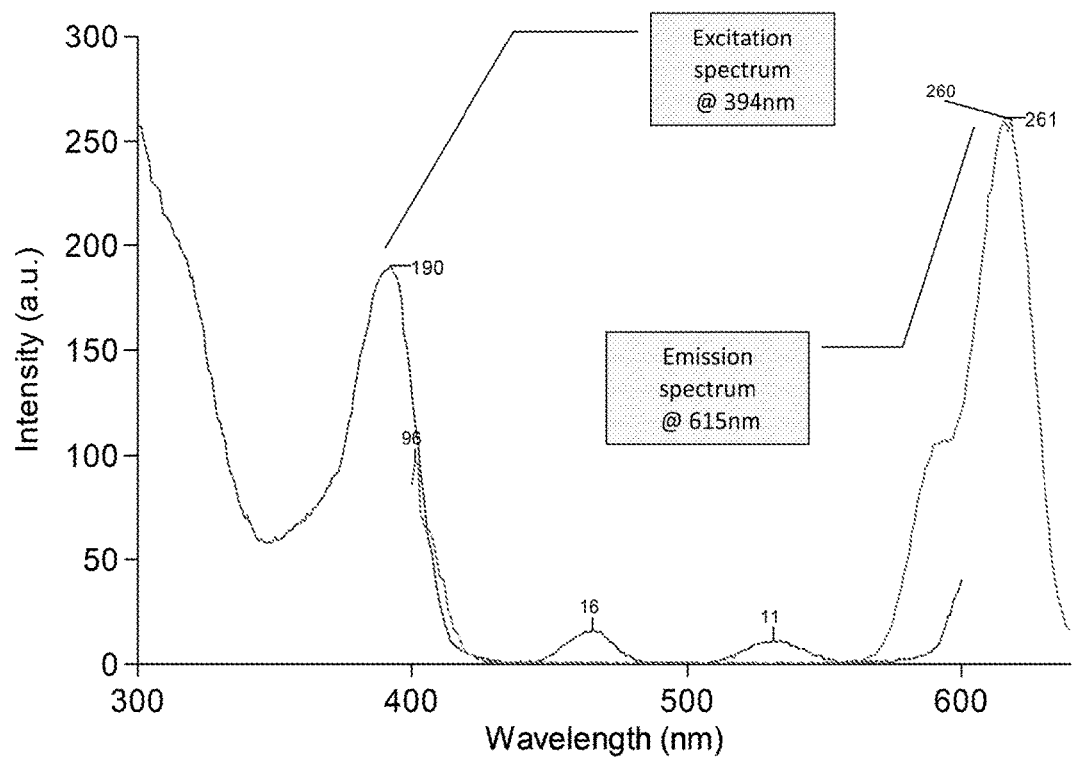
FIG. 10. Experimental data of excitation and emission of fluorescent probe used.

FIG. 9 shows a sample test that was done on the cartridge with increasing amounts of the fluorescent probe tagged to a bio-particle. The excitation and emission spectra of the fluorescent probe used for the experiment in FIG. 9 are shown in FIG. 10.

Figure 11:
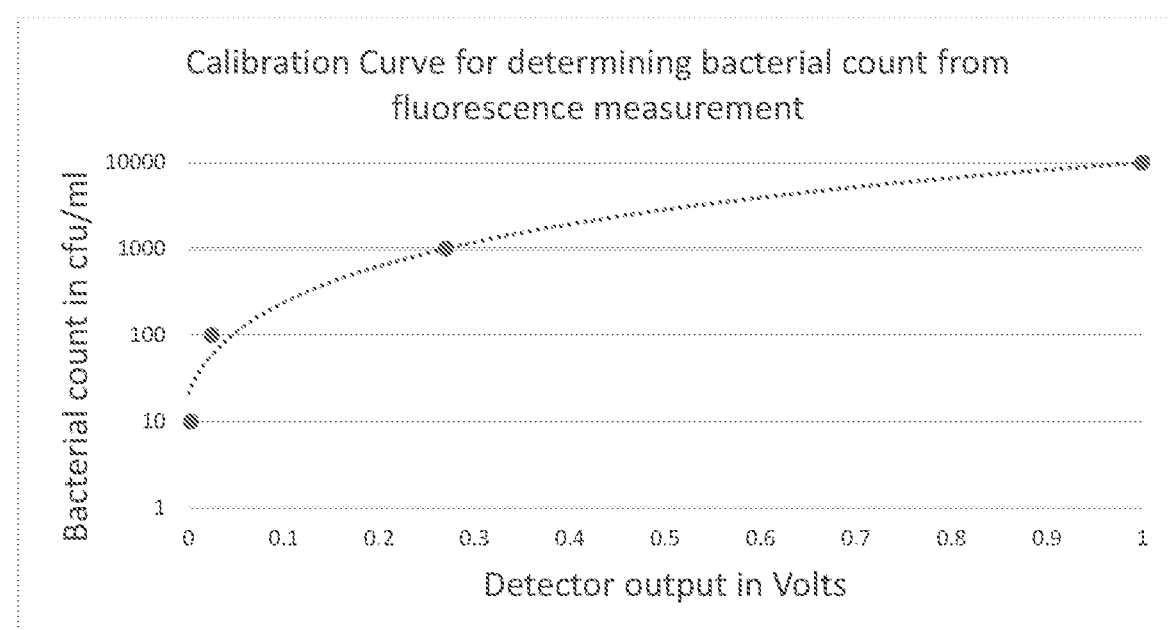
FIG. 11. Calibration curve to map the detector fluorescence reading to the bio-particle count.

Furthermore, FIG. 11 provides the calibration curve which shows the relationship between the detector output data and the amount of tagged bio-particle (mapping fluorescence to bio-particle count). Cartridge and absorbent pads are disposed after one use. The absorbent pad holder can be reused.

The invention provides a process for detecting fluorescence measurement using a reader as described herein comprising the steps of:

a. placing the vertical flow cartridge with only read buffer in the measurement slot of the reader so that the sample, e.g., bio-particle sample, is directly under the photodetector;
b. exciting the sample, e.g., bio-particle sample, with an excitation wavelength using the excitation LED array;
c. measuring the baseline fluorescence by collecting a series of fluorescence signal sample measurements, e.g., using the software control algorithm to measure the baseline reading after the amplifier output has settled and the detector outputs are in the "dark" measurement range;
d. collecting a series of measurements (several 1000 samples) by reading the output of the A/D converter that is a digitized version of the amplifier-filter output which in turn is the output of the photodetector;
e. collecting temperature readings of the detector while collecting the series of fluorescent signal sample measurements;
f. using the average of the fluorescence signal sample measurements to determine the background fluorescence measurement;
g. placing the vertical flow cartridge with a processed bio-particle sample in the measurement slot of the reader so that the processed bio-particle sample is directly under the photodetector;
h. performing steps (b)-(f) and detecting the processed bio-particle fluorescence signal sample measurements and the corresponding temperature of the detector;
i. using the temperature readings to compensate for temperature variations and calculating a corrected background fluorescence measurement and processed bio-particle fluorescence measurement; and
j. taking the difference of the processed bio-particle fluorescence measurement and background fluorescence measurement and using a calibration curve to determine the bio-particle count.

In certain embodiments, the process includes the step of; from the samples collected, further filtering and then accepting the results if the final processed samples fall within a 5% tolerance window.

In certain embodiments, the process includes the step of using the average of the fluorescence signal sample measurements in the tolerance window to determine the background fluorescence.

Key Aspects of the Reader Design of the Present Invention

Fluorescence measurement is done on a wide area sample (20 mm diameter).

Large photodetector (single or array or photomultiplier) is used to cover and image the whole sample.

Signal is collected from the whole sample as opposed to one spot on the sample container.

In the cavity of the reader, the sample size that can be processed is significantly large (5-10 ml)

Sample is spread over a large area with a very shallow depth. This maximizes the signal collected from the sample.

Imaging can be done without complex optics thus reducing cost.

Array of excitation sources are used to cover the entire area of the sample

Temperature variations of the reading area and the detection circuits are compensated by having a calibration curve for reading versus temperature.

A low noise integrating amplifier is used to keep the background measurement level low and amplify small signals.

A specialized cartridge design is used to spread the sample over a wide area.

The specialized cartridge uses a black colored material to reduce the source reflectance into the detector.

An emission filter and excitation filter are used to minimize the source illumination bleed through into the detector.

Wide area detector is more sensitive than spot measurements as signal is collected from the whole sample. The sample is spread over a larger area using a specialized vertical flow cartridge, and a large area detector is used.

The present invention is designed for the primary intent of detecting target biomolecules with a fluorescent probe selectively attached to the target biomolecule using an immunoassay. However, the method can be extended to PCR based systems for nucleotide detection.

The present invention uses a single photodetector and an emission filter to isolate the emission from the excitation. The excitation is UV but can be extended to any color light except the emission color. Multi probe detection is possible by either changing the filter wavelength or changing the excitation LED wavelength.

The present invention is described with a single cavity cartridge but can be easily extended to a multi-cavity cartridge or a plate reader where the detection assembly or the cartridge (plate) can be stepped to take measurements of all the samples.

Differentiators from Prior Art

The present invention uses a vertical flow cartridge with an open-cavity format. It is noted that a closed cartridge format (FIG. 12) can also be used in this invention. The cavity is about 15-25 mm in diameter on the top and a conical cross section with a hole of 10 mm diameter at the bottom. The vertical setup is designed to allow sample and fluid delivery and also for excitation/imaging. Liquid quantities processed is in the 10 ml range. This aspect is different when compared to the prior arts that use smaller sample size wherein imaging is done on a spot that is 1/100 the size of the present invention.

The present invention is not a SPOT imaging method. It images the whole sample cavity (20 mm diameter), thus providing a more sensitive measurement compared to the SPOT imaging method.

This is different from most prior art in fluorescent reading which use SPOT imaging method where a small 1 mm or smaller diameter spot of the microfluidic channel is imaged.

The present invention thus offers a higher detection accuracy as compared to the known priors that image spot imaging.

The present invention uses a single cavity single sample type setup to facilitate maximum detection sensitivity. This can be extended to a multi-cavity case.

The present invention uses a reaction cavity that is the same as the sample holding cavity during detection. The only change between the reaction phase and detection phase is the buffers that are added and washed through the filter at the bottom of the cartridge. The sample cavity can be adapted to do PCR thermocycling by adding a temperature cycler to the cartridge, thus making the design simpler and less cumbersome as against the prior art (for example, US 2008/0149840) that has a separate reaction chamber and a detection chamber.

We claim:

1. A process for detecting fluorescence measurements via a reader comprising:
   i. locating a vertical flow cartridge, comprising a cavity loaded with a bioparticle sample, within a slide-in slot of a reader to locate the bioparticle sample directly below a wide-area photodetector of the reader, the reader comprising:
   ii. a light-tight enclosure;
   iii. the slide-in slot arranged within the light-tight enclosure and configured to receive the vertical flow cartridge defining the cavity loaded with the bioparticle sample and defining a cavity size;
   iv. the wide-area photodetector:
      (1) arranged within the light-tight enclosure above the slide-in slot;
      (2) defining a detector area exceeding the cavity size; and
      (3) configured to receive a fluorescent signal emitted from the bioparticle sample;
   v. an array of excitation LEDs arranged adjacent the wide-area photodetector and configured to apply a uniform excitation intensity throughout the cavity to illuminate the cavity;
   vi. an optical emission filter:
      (1) arranged between the wide-area photodetector and the cavity; and
      (2) configured to attenuate wavelengths outside of an emission wavelength range; o
   vii. a low-noise amplifier coupled to the wide-area photodetector and configured to amplify a signal output by the wide-area photodetector; and
   viii. an analog integrator coupled to the low-noise amplifier and configured to reduce noise in the signal;
   a. exciting the bioparticle sample with an excitation wavelength using via the array of excitation LEDs;
   b. collecting a series of fluorescence signal sample measurements for the bioparticle sample;
   c. collecting a series of temperature readings of the detector wide-area photodetector while collecting the series of fluorescent signal sample measurements;
   d. deriving a bioparticle fluorescence measurement based on an average of the series of fluorescence signal sample measurements;
   e. calculating a corrected bioparticle fluorescence measurement based on the bioparticle fluorescence measurement and the series of temperature readings;

f. accessing a background fluorescence measurement corresponding to detected fluorescence of a read buffer loaded in the slide-in slot absent the bioparticle sample;
g. calculating a difference between the corrected bioparticle fluorescence measurement and the background fluorescence measurement; and
h. estimating a bioparticle count for the bioparticle sample based on the difference and a calibration curve linking outputs of the wide-area photodetector to bioparticle counts of samples loaded in the slide-in slot.

2. The process of claim 1, further comprising filtering and accepting results if the series of fluorescence signal sample measurements fall within a 5% tolerance window.

3. The process of claim 1:
wherein locating the vertical flow cartridge within the slide-in slot of the reader comprises locating the vertical flow cartridge within the slide-in slot of the reader comprising a lens positioned to collect all of the signal from a sample loaded in the slide-in slot and feed all of the signal to the wide-area photodetector; and
wherein collecting the series of fluorescence signal sample measurements for the bioparticle sample comprises collecting all of the signal from the bioparticle sample and feeding all of the signal to the wide-area photodetector via the lens.

4. The process of claim 1, wherein locating the vertical flow cartridge within the slide-in slot of the reader comprises locating the vertical flow cartridge within the slide-in slot of the reader comprising a controller configured to regulate an excitation wavelength of one or more LED of the array of excitation LEDs.

5. The process of claim 1, wherein the reader further comprises a temperature sensor configured to collect temperature measurements of the wide-area photodetector.

6. The process of claim 5, wherein locating the vertical flow cartridge within the slide-in slot of the locating the vertical flow cartridge within the slide-in slot of the reader comprising a processor and a computer readable medium comprising a non-transitory memory encoded with instructions to be executed by the processor configured to extract a set of signal samples from a series of collected signal samples and calculate the bioparticle count based on the set of signal samples and temperature drift based on temperature measurements of the wide-area photodetector.

7. The process of claim 1, wherein locating the vertical flow cartridge within the slide-in slot of the reader comprises locating the vertical flow cartridge within the slide-in slot of the reader comprising an analog to digital converter that converts an analog output of the analog integrator into digital domain.

8. The process of claim 7, wherein locating the vertical flow cartridge within the slide-in slot of the reader comprises locating the vertical flow cartridge within the slide-in slot of the reader comprising a post processor that collects a series of signal samples from the analog to digital converter over a time duration.

9. The process of claim 1, wherein accessing the background fluorescence measurement corresponding to detected fluorescence of a read buffer loaded in the slide-in slot absent the bioparticle sample comprises:
locating the vertical flow cartridge, comprising the cavity loaded with the read buffer absent the bioparticle sample, within the slide-in slot directly below the wide-area photodetector;
exciting the read buffer with the excitation wavelength via the array of excitation LEDs;
collecting a second series of fluorescence signal sample measurements for the read buffer;
collecting a second series of temperature readings of the wide-area photodetector while collecting the second series of fluorescent signal sample measurements; and
calculating the background fluorescence measurement based on an average of the second series of fluorescence signal sample measurements and the second series of temperature readings.

10. A method for deriving fluorescence of a bioparticle sample comprising:
loading a read buffer into a cavity of a vertical flow cartridge to generate a bioparticle sample comprising target bioparticles, dispersed throughout the read buffer;
inserting the vertical flow cartridge within a slide-in slot of a reader to locate the bioparticle sample below a wide-area photodetector, arranged within the reader, configured to detect fluorescence of the bioparticle sample and defining a detector area exceeding the cavity size;
triggering activation of an array of excitation LEDS arranged adjacent the wide-area photodetector, within the reader, and configured to apply a uniform excitation intensity throughout the cavity at an excitation wavelength to excite the bioparticle sample;
during a detection period:
accessing a series of fluorescence measurements for the bioparticle sample collected by the wide-area photodetector; and
recording a series of temperature measurements for the wide-area photodetector recorded by a temperature sensor installed within the reader;
deriving a bioparticle fluorescent measurement based on the series of fluorescence measurements and the series of temperature measurements;
accessing a background fluorescence measurement corresponding to detected fluorescence of a volume of the read buffer, absent target bioparticles, loaded in the slide-in slot of the reader;
deriving a difference between the bioparticle fluorescent measurement and the background fluorescence measurement;
accessing a calibration curve linking fluorescence of bioparticle samples to presence of the target bioparticle in bioparticle samples loaded in the reader; and
estimating a bioparticle count, corresponding to presence of the target bioparticle in the bioparticle sample, based on the difference and the calibration curve.

11. The method of claim 10:
wherein accessing the calibration curve linking fluorescence of bioparticle samples to presence of the target bioparticle in bioparticle samples loaded in the reader comprises accessing the calibration curve linking fluorescence of bioparticle samples to concentration of the target bioparticle in bioparticle samples loaded in the reader; and
wherein estimating the bioparticle count, corresponding to presence of the target bioparticle in the bioparticle sample, based on the difference and the calibration curve comprises estimating a concentration of the target-bioparticle in the bioparticle sample based on the difference and the calibration curve.

* * * * *